(12) United States Patent
Cho et al.

(10) Patent No.: US 7,157,525 B2
(45) Date of Patent: Jan. 2, 2007

(54) THERMOPLASTIC ELASTOMER RESIN

(75) Inventors: Sung-Hwan Cho, Daejeon (KR); Sun-Woong Kim, Daejeon (KR); Jun-Hee Lee, Daejeon (KR); Oh-Kwun Son, Daejeon (KR); Byung-Ho Lim, Daejeon (KR)

(73) Assignee: Samyang Corporation, Seoul (KR)

( * ) Notice: Subject to any disclaimer, the term of this patent is extended or adjusted under 35 U.S.C. 154(b) by 26 days.

(21) Appl. No.: 10/539,582

(22) PCT Filed: Dec. 17, 2003

(86) PCT No.: PCT/KR03/02758

§ 371 (c)(1),
(2), (4) Date: Jun. 17, 2005

(87) PCT Pub. No.: WO2004/058891

PCT Pub. Date: Jul. 15, 2004

(65) Prior Publication Data

US 2006/0047089 A1   Mar. 2, 2006

(30) Foreign Application Priority Data

Dec. 30, 2002   (KR) ...................... 10-2002-0086623

(51) Int. Cl.
*C08F 20/00* (2006.01)
*C08G 63/00* (2006.01)

(52) U.S. Cl. ...................... 525/440; 528/190; 528/194; 528/195; 528/206; 528/298; 528/300; 528/301; 528/302; 528/307; 528/308; 528/308.6; 528/310; 525/437; 525/443; 525/444; 525/450; 525/534; 525/540

(58) Field of Classification Search ................ 528/190, 528/194, 195, 206, 298, 300, 301, 302, 307, 528/308, 308.6, 310; 525/437, 440, 443, 525/444, 450, 534, 540; 264/176.1, 464
See application file for complete search history.

(56) References Cited

U.S. PATENT DOCUMENTS

| 3,723,568 A | 3/1973 | Hoeschele |
| 4,071,503 A | 1/1978 | Thomas et al. |
| 5,733,986 A | 3/1998 | Senda et al. |

FOREIGN PATENT DOCUMENTS

| EP | 0357193 A | 3/1990 |
| EP | 0357194 A | 3/1990 |
| JP | 60-090249 A | 5/1985 |
| JP | 04-285631 A | 10/1992 |

*Primary Examiner*—Samuel A. Acquah
(74) *Attorney, Agent, or Firm*—Birch, Stewart, Kolasch & Birch, LLP

(57) ABSTRACT

The present invention relates to a thermoplastic elastomer resin which has good melt viscosity, melt tension, and thermal resistance, wherein it is prepared by introducing a chain extender and a stabilizer for hydrolysis to a thermoplastic elastomer resin produced through melt polymerization in the presence of hydroxy carboxylic acid compound and subjecting the mixture to reactive extrusion to increase the molecular weight and crosslinking degree of the elastomer resin. The thermoplastic elastomer resin according to the present invention has good properties for automobile parts, particularly constant velocity joint boots and bellows.

15 Claims, No Drawings

THERMOPLASTIC ELASTOMER RESIN

TECHNICAL FIELD

The present invention relates to a novel thermoplastic elastomer resin and a process for preparing thereof, which resin is suitable for automobile parts, particularly constant velocity joint boots and bellows, because it has good melt viscosity, melt tension, and thermal resistance. More particularly, the present invention relates to a thermoplastic elastomer resin having good properties and to a process for preparing thereof, which comprises subjecting diethylene glycol bisphenol-A (hereinafter referred to as "DEG-BPA") to melt polymerization, and subjecting the polymerized product to reactive extrusion by using hydroxy carboxylic acid compound, diisocyanate, and carbodiimide.

BACKGROUND ART

Polyester-type thermoplastic elastomer (below "TPE") has good oil resistance and chemical resistance as well as excellent low temperature impact property. Thus, it has been widely used in automobile and electric/electronic fields. However, particularly chloroprene rubber (CR), which has been widely used for automobile parts, has poor durability. Thus, recently CR has been replaced with TPE. The use of TPE has been expanded in North America and Europe since it has a good light weight property, resistant-fatigability, chemical resistance, and ozone resistance, compared with CR. Particularly, since TPE for extrusion blowing is produced through blowing procedure in the melting state, resin should have good melt viscosity and melt tension in the melting state, and the thickness distribution of processed product during extrusion blowing should be constant.

Generally speaking, TPE cannot be subjected to extrusion-blowing due to its low melt viscosity and melt tension in the melting state. The melt viscosity or melt tension of TPE may be increased at melt polymerization by using branching agent, but is not sufficient. In order to solve this problem, there was an attempt to increase the melt viscosity and melt tension of TPE by using crosslinking agent in the extruder after melt polymerization, but constant physical properties of TPE could not be obtained. For instance, according to U.S. Pat. No. 4,071,503, hydroxyl group and carboxylic acid group, the terminal groups of elastomer, are reacted with using diisocyanate or polycarbodiimide to improve melt viscosity and melt tension, and so could obtain TPE which may be subjected to extrusion blowing. However, its productivity was poor since the residence time in the extruder was unduly long. U.S. Pat. No. 5,733,986 discloses that the number of terminal groups of TPE is controlled in order to make hydroxyl group and carboxylic acid group, the terminal groups of TPE, fully react, thereby inducing the reaction of isocyanate group with hydroxyl group and the reaction of carboxylic acid with polyepoxy compound, to obtain TPE for blowing. However, the method did not solve the problems of thermal resistance and residence time yet. Diisocyanate group shows rapid reactivity with hydroxyl group, and polyethoxy compound shows rapid reactivity with carboxylic acid, thereby inducing the increase of viscosity. However, a sufficient residence time in the extruder is needed to control the difference of reaction rate between the above groups, which is closely related to productivity. Particularly, diisocyanate mostly reacts with hydroxyl group in the chain, and thus if the residence time in the excluder is insufficient, the reaction is not occurred enough. As a result therefrom, gas by unreacted diisocyanate at extrusion blowing may be generated. Also, unreacted diisocyanate may induce a continuous reaction in the remelting process at polymer processing, which also affects the control of polymer processing condition. Therefore, the reaction of diisocyanate should be fully done, and the variation in physical property by product lot should be minimized by increasing reactivity.

DISCLOSURE OF THE INVENTION

To solve the drawbacks explained above, the present inventors have carried out a continuous research, and discovered that thermoplastic elastomer resin (TPE-B) having good melt viscosity, melt tension, and thermal resistance is produced by introducing chain extender and stabilizer for hydrolysis with hydroxy carboxylic acid compound to the polymerized product in order to use it for blowing through increasing the molecular weight, after forming thermoplastic elastomer resin (TPE-A) comprising aromatic dicarboxylic acid, diol having a low molecular weight, polyalkylene oxide, and diethyleneglycol bisphenol-A through melt polymerization, in preparing thermoplastic elastomer. The present invention was completed on the basis of the above discovery.

In the present invention, hydroxy carboxylic acid compound that is added at the reactive extrusion maintains the number of hydroxyl group that may react with isocyanate group optimal, thereby to make reactivity of diisocyanate, chain extender, optimal. Also, because carbodiimide is used in order to increase hydrolytic resistance, the chain extender and stabilizer for hydrolysis may fully react with elastomers in the twin screw extruder to produce thermoplastic elastomer having good thermal resistance and no variation in physical property of the product. Also, hardness may be easily and freely controlled by introducing hydroxy carboxylic acid compound at the time of preparing thermoplastic elastomer resin (TPE-B). The hardness of thermoplastic elastomer resin (TPE-B) may be controlled by the content of polyalkyleneoxide that is introduced at the time of preparing thermoplastic elastomer resin (TPE-A). Thus, to produce elastomers with different levels of hardness depending on use, previously polymerization reaction had been carried out by adjusting the content of polyalkyleneoxide. However, the present invention has an advantage that hardness may be controlled through a reaction for a short period of time, instead of controlling the content of polyalkyleneoxide, by using hydroxy carboxylic acid compound at the reactive extrusion.

Therefore, one object of the present invention is to provide thermoplastic elastomer resin (TPE-A) characterized in comprising aromatic dicarboxylic acid, diol having a low molecular weight, and 0.3~9.0 weight % of diethyleneglycol bisphenol-A (DEG-BPA) with polyalkyleneoxide.

It is another object of the present invention to provide thermoplastic elastomer resin (TPE-B) suitable for automobile parts, particularly constant velocity joint boots and bellows since it has good melt viscosity, melt tension and thermal resistance characterized in that it comprises hydroxy carboxylic acid compound, diisocyanate and carbodiimide with the above TPE-A.

It is still another object of the present invention to provide a process for preparing the above thermoplastic elastomer resin (TPE-B).

BEST MODE FOR CARRYING OUT THE INVENTION

Thermoplastic elastomer resin (TPE-A) according to the present invention comprises aromatic dicarboxylic acid, diol having a low molecular weight, polyalkylene oxide, and diethyleneglycol bisphenol-A (DEG-BPA). Thermoplastic elastomer resin (TPE-B) comprises hydroxy carboxylic acid compound, diisocyanate, and carbodiimide, with the above thermoplastic elastomer resin (TPE-A).

Thermoplastic elastomer resin is thermoplastic polymer which hard segment and soft segment is block copolymerized. Thermoplastic elastomer resin (TPE) according to the present invention uses aromatic dicarboxylic acid and diol having a low molecular weight as a hard segment component, and polyalkylene oxide as a soft segment component.

The aromatic dicarboxylic acid may include terephthalic acid (TPA), isophthalic acid (IPA), 1,5-dinaphthalenedicarboxylic acid (1,5-NDCA), 2,6-naphthalenedicarboxylic acid (2,6-NDCA), and dimethyl terephthalate (DMT) and dimethyl isophthalate (DMI), in which diacid is replaced with dimethyl group, and mixture thereof, but DMT is preferable. In preparing thermoplastic elastomer resin (TPE-A) according to the present invention, aromatic dicarboxylic acid is used in the amount of 30~45 weight %, preferably 33~40 weight %. If the aromatic dicarboxylic acid is used in the amount less than 30 weight % or over 45 weight %, the reaction balance is lost to disturb the reaction.

Diol having a low molecular weight according to the present invention includes ethyleneglycol, propyleneglycol, 1,2-propane diol, 1,3-propane diol, 1,4-butane diol, 1,5-pentane diol, 1,6-hexane diol, and 1,4-cyclohexanedimethanol, but 1,4-butane diol is preferable. Diol having a low molecular weight is used in the amount of 15~30 weight %, preferably 20~25 weight %. If diol having a low molecular weight less than 15 weight % or over 30 weight % is used, the reaction balance is lost to disturb the reaction, as in aromatic dicarboxylic acid.

As polyalkylene oxide may be used polyoxyethylene glycol, polyoxypropylene glycol, polyoxytetramethylene glycol (PTMEG), etc. PTMEG is preferably used among those. Particularly, it is preferable for PTMEG to have a number average molecular weight of 1,000~3,000, and more preferable of 2,000. Generally speaking, the hardness of polyester-type elastomer is expressed by Shore hardness-D (Shore-D), which is determined by the content of polyalkylene oxide. That is, the more the content of polyalkylene oxide is, the lower the hardness (Shore hardness-D) is.

In preparing thermoplastic elastomer resin (TPE-A) according to the present invention, 20~50 weight %, preferably 30~45 weight %, of polyalkylene oxide is used. If polyalkylene oxide is present in the amount less than 20 weight %, the hardness of TPE is high, and thus the resistance against wear due to friction in the product after polymer processing gets high. If over 50 weight %, it could be a problem that the thermal resistance of TPE itself is low.

Diethyleneglycol bisphenol-A (DEG-BPA) can be represented by the following formula (1):

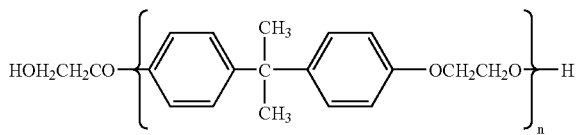

(1)

wherein, n denotes a positive integer of 1 to 5, preferably 1 to 3.

In preparing TPE-A according to the present invention, DEG-BPA of the above formula (1) reacts with aromatic dicarboxylic acid. A part of aromatic dicarboxylic acid and of hard segment of diol having a low molecular weight is substituted by DEG-BPA, which makes thermal-resistance good.

When preparing TPE-A according to the present invention, the DEG-BPA is used in the amount of 0.3~9.0 weight %, preferably 0.5~5.0 weight %, more preferably 1.5~4.0 weight %. In case that DEG-BPA is less than 0.3 weight %, the improvement of elastic recovery rate and processability is insignificant. In case that over 9.0 weight %, it is difficult to control the hardness of TPE.

For the thermoplastic elastomer resin (TPE-A) according to the present invention, additives such as branching agent may also be used. Branching agent may increase the melt viscosity and melt tension of elastomer. As branching agent, glycerol, pentaerythritol, neopentylglycol, etc., preferably glycerol, may be used in the amount of 0.05~0.10 weight %. If the branching agent is less than 0.05 weight %, it is hard to expect the increase of melt viscosity. If over 0.10 weight %, the melt viscosity of TPE-A is so overly raised that it is difficult to control the inherent viscosity at melting polymerization.

The preparation process of thermoplastic elastomer resin (TPE-A) according to the present invention consists of two steps, oligomerization and polycondensation. Oligomerization is carried out at 140~215° C. for 3~4 hours by using 0.025~0.03 weight % of titanium butoxide (TBT) as catalyst. Polycondensation is processed by reducing the pressure stepwise from 760 torr to 0.3 torr.

In the above polycondensation, tetrahydroxyfurane (THF), which is highly volatile and may cause appearance defect of the processed product due to generation of smell and gas at polymer processing, may be generated by the decomposition of PTMEG. Thus, the present invention uses such a polycondensation process that in order to suppress the generation of THF up to the maximum, the pressure is reduced from 760 torr to 0.3 torr for 1 hour, the vacuum condition of 0.3 torr or less is applied for additional 3~4 hours, the temperature of reactor is raised from 210° C. to 250° C. for 2 hours, and the final temperature of 250° C. is maintained for the remaining 2~3 hours.

Branched polyester-type elastomer (TPE-A) is prepared according to the above melt polymerization, with containing 30~45 weight % of aromatic dicarboxylic acid, 15~30 weight % of diol having a low molecular weight, 20~50 weight % of polyallylene oxide, and 0.3~9.0 weight % of diethyleneglycol bisphenol-A, represented by the formula (1). TPE-A is obtained by predicting its molecular weight on the basis of Torque applied to the stirrer of polycondensation reactor. The molecular weight of obtained thermoplastic elastomer resin (TPE-A) is expressed by its inherent viscosity (I.V). Its inherent viscosity has a value of 1.6~1.8 dl/g when measured in the solvent of 50/50 of phenol/tetrachloroethane (TCE).

TPE-A according to the present invention has a good elastic recovery rate and processability, compared with TPE without DEG-BPA. That is, TPE-A can be processed at a low temperature since the melting temperature of resin is lowered by 10~20° C. compared with TPE without BEG-BPA. It is desirable that the Melt Index (MI) of TPE-A has a range of 13~17 g/10 min under 230° C. and 2.16 kg, preferably 14~16 g/10 min.

Furthermore, because DEG-BPA lowers the melting temperature of TPE-A, TPE-A has good processability since its processing temperature at polymer processing after extrusion is low compared with TPE polymerized by only aromatic dicarboxylic acid, diol having a low molecular weight, and polyalkylene oxide. However, TPE-A itself has still such low melt viscosity or melt tension that it does not have optimal physical property for extrusion blowing, suitable for constant velocity joint boots or bellows.

The increase of molecular weight and crosslinking degree of TPE-A may lead to the increase of melt viscosity and melt tension to result in good extrusion property. Therefore, in the present invention, as a means to increase the molecular weight and crosslinking degree of TPE-A prepared according to the above process, diisocyanate and hydroxy carboxylic acid compound, chain extender, and carbodiimide, stabilizer for hydrolysis, are added to improve reactivity and so to prepare thermoplastic elastomer resin (TPE-B) of the present invention. That is, if diisocyanate of chain extender, hydroxy carboxylic acid compound, and carbodiimide of stabilizer for hydrolysis are together reacted with TPE-A, the reaction rate of diisocyanate and carbodiimide may be increased.

As hydroxylcarboxylic acid compound may be used polyethylene terephthalate (PET), polyethylene naphthalate (PEN), polybuthylene naphthalate (PBN), polycyclohexane terephthalate(PCT), polybuthylene terephthalate (PBT), etc. Among them, it is desirable that PET, PEN, PBN and PCT have inherent viscosity (I.V.) of 0.5~1.0 dl/g, and PBT has inherent viscosity of 0.7~1.3 dl/g, preferably 0.75~1.1 dl/g, and more preferably 0.8~0.9 dl/g, represented by the following formula (2):

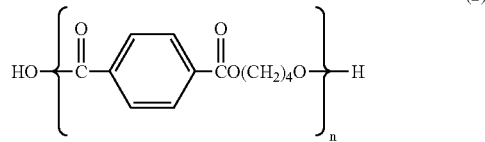

(2)

wherein n denotes a positive integer of 70 to 100, preferably 80 to 90.

The content of hydroxy carboxylic acid compound in TPE-B is 3~28 weight %, preferably 3~25 weight %, and more preferably 3~20 weight %. If the content of hydroxy carboxylic acid compound is less than 3 weight %, it is difficult to expect complete reactivity of diisocyanate and carbodiimide and if over 28 weight %, there is a disadvantage that the impact strength under cold temperature of elastomer is lowered remarkably.

Diisocyanate, chain extender, is used in the amount of 0.1~5.0 weight %, preferably 0.5~3.0 weight %, and more preferably 1.0~2.5 weight %. As diisocyanate toluene diisocyanate may be used 4,4-diphenylmethane diisocyanate or its modified product, or mixtures thereof. Only, the reactivity of 4,4-diphenylmethane diisocyanate may be lowered due to a reaction with moisture and its storage is not easy, and so thereby it is not easy to control the variation of physical property by product lot at the extrusion reaction. Thus, it is desirable to use a modified product of 4,4-diphenylmethane diisocyanate represented by the following formula (3):

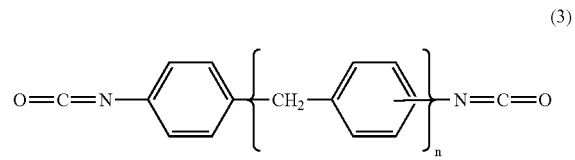

(3)

wherein n denotes a positive integer of 1 to 3 and the content of N=C=O is 29~30 weight %.

The modified product of 4,4-diphenylmethane diisocyanate represented by the formula (3) may be kept in the liquid state at room temperature, and so is easy for introducing at extrusion and good for long-term storage. Thus, the variation of physical property by product lot can be minimized. Furthermore, a high increase in melt viscosity and product processability of the modified product of 4,4-diphenylmethane diisocyanate may be expected even with a small introduction amount compared with 4,4-diphenylmethane diisocyanate in the form of monomer. Also, the adding amount of stabilizer for hydrolysis may be even more reduced since some carbodiimide is contained.

Also, carbodiimide as stabilizer for hydrolysis has durability required for automobile parts such as constant velocity joint boots or bellows. Carbodiimide as stabilizer for hydrolysis according to the present invention is used in the amount of 0.05~1.0 weight %, preferably 0.1~0.8 weight %, and more preferably 0.2~0.5 weight %. If carbodiimide is used in the amount less than 0.05 weight %, it is difficult to obtain hydrolytic resistance, and if over 1.0 weight %, processability problem due to crosslinking is present.

Furthermore, thermoplastic elastomer resin may contain additional additives such as thermal stabilizer, antioxidant, lubricant, silicone type master batch, and carbon black master batch.

Thermoplastic elastomer resin (TPE-B) is prepared by reactive extrusion. It is preferable that the residence time in the extruder is 50~80 seconds, especially 50~60 seconds. It is preferable that the temperature in the extruder is 170~240° C. and the screw rpm is 100~300 rpm.

The thermoplastic elastomer resin (TPE-B) according to the present invention prepared by the present process comprises 66~96.85 weight % of TPE-A, 3~28 weight % of hydroxycarboxylic acid compound, 0.1~5.0 weight % of diisocyanate, and 0.05~1.0 weight % of carbodiimide. Also, the thermoplastic elastomer resin (TPE-B) according to the present invention exhibits such physical properties as melt index ratio (MIR) of 1.0~1.5, melt tension of 40 mN or more, and melt viscosity of 40,000 poise or more, and has thermal resistance to heat distortion temperature (HDT) of 75° C. or more.

The present invention will be more specifically explained by way of the following Examples and Comparative Examples. However, it should be understood that these Examples and Comparative Examples are intended to illustrate the present invention but not in any manner to limit the scope of the present invention.

EXAMPLES

The physical properties of TPE-B according to the present invention are determined by measuring the following items.

1. Shore hardness-D (Shore-D)

Shore hardness-D, surface hardness of TPE, is determined according to ASTM D-2240. The smaller its value is, the softer it is. The shore hardness-D for constant velocity joint boots or bellows is preferable to be in the range of 35~55, and more preferable 40~50.

2. Melt Index (MI)

Melt Index is determined according to ASTM D-1238 under the conditions of 230° C. and 2.16 kg. In case of TPE for extrusion, it is desirable that the MI is in the range of 0.5~3.0 g/10 min, preferably 1.0~2.0 g/10 min, and more preferably 1.0~1.5 g/10 min. The MI less than 0.5 g/10 min results in too low extrusion productability, and if over 3.0 g/10 min, the shape stability at extrusion is decreased.

3. Melt Index Ratio (MIR)

MIR is the ratio of Melt Index depending on the time staying in the MI Tester, represented by the formula: MIR=G2/G1, wherein G1 is an output(g) during one minute after melting and G2 is an output(g) during five minutes after melting. The MIR of TPE for extrusion should be in the range of 1.0~1.5, preferably 1.0~1.3, and more preferably 1.0~1.1. MIR is the most important physical property at extrusion processing. MIR less than 1.0 means that the reaction of diisocyanate introduced at reactive extrusion is not fully done, and so the reaction continues even at the time of measuring MI. Therefore, in case MIR is less than 1.0, it is difficult to prepare a consistent polymer processing standard at polymer processing. Also, in case MIR is over 1.5, the polymer processing itself is difficult at extrusion.

4. Melt Tension

Melt tension is determined by using extensional rheometer (Göffert REOTENS 71.97). Die of capillary rheometer has L/D of 32/2. Melted polymer which is outputted is taken up to measure the melt tension in the melting state. The value of melt tension is in the range of 35~70 mN, preferably 40~60 mN. The Melt Extension less than 35 mN results in the decrease of thickness distribution and shape stability at the time of extrusion blowing, and more than 70 mN results in the decrease of productability.

5. Melt Viscosity

Melt Viscosity is measured at the respective temperature of 230° C., 240° C. and 250° C. within the range of extrusion shear rate by using RDS (Rheometeric Dynamic Spectrometer).

6. Heat Distortion Temperature (HDT)

HDT of ¼" specimen is determined under 4.16 kgf/cm$^2$ according to ASTM D 648.

7. Elastic Recovery Rate

A machine specimen injected by ASTM D 638 is installed to the jig by temperature, and the Elastic Recovery Rate of the specimen is measured after thermal treating for a desired time. Elastic Recovery Rate is determined as a ratio of the angle of specimen after annealing to the angle of specimen before annealing.

8. Impact Strength

Impact Strength is measured according to ASTM D 256 at both room temperature (23° C.) and low temperature (−40° C.).

9. Mechanical Physical Property

Tensile property and flexion property are determined according to ASTM D 638,790.

Example 1

34.6 weight % of DMT, 21.2 weight % of 1,4-butane diol, 40.2 weight % of PTMEG having the molecular weight of 2,000, 3.8 weight % of DEG-BPA (n=1, HanNong Wha-Sung, Koremul-BSA-20), and 0.065 weight % of glycerol are introduced into an oligomerization reactor, and 0.025 weight % of TBT as a catalyst is added. The reaction temperature is in the range of 140~215° C., and elevated from 140° C. to 215° C. during 120 minutes. For an additional 120 minutes, the reaction proceeds while the temperature is maintained at 215° C. The reaction is terminated when the reaction rate is 99% or more by converting the amount of methanol, reaction eluant, to the reaction rate. Thereafter, 0.04 weight % of TBT, a catalyst, and 0.07 weight % of Irganox 1010, thermal stabilizer are added to carry out polycondensation. The polycondensation is carried out by increasing the temperature from 215° C. to 250° C. for 120 minutes, and further reacting for additional 120 minutes that the temperature is maintained at 250° C. At this time, the pressure is reduced from 760 torr to 0.3 torr for 1 hour, the vacuum condition is controlled to 0.3 torr or less for additional 3 hours, and the final pressure is controlled at 0.3 torr or less, to prepare TPE-A.

TPE-A prepared above is subjected to reactive extrusion by using a twin screw type of extruder. To obtain desirable extrusion property, 1.0 weight % of the modified product of 4,4-diphenylmethane diisocyanate (n=1, the content of N=C=O is 29~30 weight %) and 0.2 weight % of carbodiimide are introduced at the same time with 93 weight % of TPE-A and 3.0 weight % of PBT as main components. Additionally, 0.5 weight % of thermal-stabilizer, 0.5 weight % of antioxidant, 0.5 weight % of lubricant, 0.6 weight % of silicone-type master batch, and 0.7 weight % of carbon black master batch are added to make the total components to 100 weight %, and then the reactive extrusion is carried out. At this time, the conditions in the twin screw type of extruder are adjusted to the temperature of 170~240° C., the screw rpm of 100~300 rpm, and the residence time of 50~60 seconds. The composition and physical property of TPE-B thus obtained are listed at Tables 1 and 2 below.

Example 2

The same procedure as Example 1 is applied except that 76 weight % of TPE-A prepared according to the same procedure as Example 1 and 20 weight % of PBT are used. The composition and physical properties of the obtained TPE-B are listed at Tables 1 and 2 below.

Example 3

TPE-A is prepared according to the same procedure as Example 1 except that in the oligomerization, 36.3 weight % of DMT, 23.4 weight % of 1,4-butane diol, 39.7 weight % of PTMEG having the molecular weight of 2,000, 0.4 weight % of DEG-BPA (n=1, HanNong WhaSung Koremul-BSA-20), and 0.065 weight % of glycerol are added to the oligomerization reactor, and 0.025 weight % of TBT, a catalyst, is further added. Thereafter, in the polycondensation, 0.04 weight % of TBT, a catalyst, and 0.07 weight % of Irganox 1010, thermal stabilizer, are introduced to carry out the polycondensation. By using TPE-A thus obtained, TPE-B is prepared as the same composition as Example 1. The composition and physical properties of TPE-B thus obtained are listed in Tables 1 and 2 below.

Example 4

TPE-A is prepared according to the same procedure as Example 1 except that in the oligomerization, 33.1 weight % of DMT, 19.3 weight % of 1,4-butane diol, 40.6 weight % of PTMEG having the molecular weight of 2,000, 6.8 weight % of DEG-BPA (n=1, HanNong WhaSung Koremul-BSA-20) and 0.059 weight % of glycerol are introduced to the oligomerization reactor, and 0.028 weight % of TBT, a catalyst, is further added. Thereafter, in the polycondensation, 0.043 weight % of TBT, a catalyst, and 0.07 weight % of Irganox 1010, thermal stabilizer, are added to carry out the polycondensation. By using TPE-A thus obtained, TPE-B is prepared as the same composition as Example 1. The composition and physical properties of thus obtained TPE-B are listed in Tables 1 and 2 below.

Comparative Example 1

The same procedure as Example 1 is applied except that 96 weight % of TPE-A prepared according to the same procedure as Example 1 is used and PBT is not used. The composition and physical properties of TPE-B thus obtained are listed in Tables 1 and 2 below.

Comparative Example 2

The same procedure as Example 1 is applied except that 66 weight % of TPE-A prepared according to the same procedure as Example 1 and 30 weight % of PBT are used. The composition and physical properties of thus obtained TPE-B are listed in Tables 1 and 2 below.

Comparative Example 3

The same procedure as Example 1 is applied except that diisocyanate and carbodiimide are not used, and additional additives in 4.0 weight % total (thermal stabilizer of 0.8 weight %, antioxidant of 1.2 weight %, lubricant of 0.5 weight %, silicone-type master batch of 0.8 weight %, and carbon black master batch of 0.7 weight %). The composition and physical properties of thus obtained TPE-B are listed in Tables 1 and 2 below.

Comparative Example 4

The same procedure as Example 1 is applied except that diisocyanate is not used and additional additives in 3.8 weight % total (thermal stabilizer of 0.8 weight %, antioxidant of 1.0 weight %, lubricant of 0.5 weight %, silicone-type master batch of 0.8 weight %, and carbon black master batch of 0.7 weight %). The composition and physical properties of thus obtained TPE-B are listed in Tables 1 and 2 below.

Comparative Example 5

The same procedure as Example 1 is applied except that the residence time in the extruder is 40 seconds. The composition and physical properties of thus obtained TPE-B are listed in Tables 1 and 2 below.

Comparative Example 6

The same procedure as Example 1 is applied except that 96 weight % of TPE obtained without DEG-BPA is used and PBT is not used. The composition and physical properties of thus obtained TPE-B are listed in Tables 1 and 2 below.

TABLE 1

| | TPE-B | | | | | | |
|---|---|---|---|---|---|---|---|
| | TPE-A (wt %) | TPE* (wt %) | PBT (wt %) | diisocyanate (wt %) | carbodiimide (wt %) | additional additive** (wt %) | retention time (sec.) |
| Ex. 1 | 93 | | 3 | 1.0 | 0.2 | 2.8 | 50~60 |
| Ex. 2 | 76 | | 20 | 1.0 | 0.2 | 2.8 | 50~60 |
| Ex. 3 | 93 | | 3 | 1.0 | 0.2 | 2.8 | 50~60 |
| Ex. 4 | 93 | | 3 | 1.0 | 0.2 | 2.8 | 50~60 |
| Comp. Ex. 1 | 96 | | 0 | 1.0 | 0.2 | 2.8 | 50~60 |
| Comp. Ex. 2 | 66 | | 30 | 1.0 | 0.2 | 2.8 | 50~60 |
| Comp. Ex. 3 | 93 | | 3 | 0 | 0 | 4.0 | 50~60 |
| Comp. Ex. 4 | 93 | | 3 | 0 | 0.2 | 3.8 | 50~60 |
| Comp. Ex. 5 | 93 | | 3 | 1.0 | 0.2 | 2.8 | 40 |
| Comp. Ex. 6 | | 96 | 0 | 1.0 | 0.2 | 2.8 | 50~60 |

*TPE: TPE polymerized without DEG-BPA
**Additional additives: thermal stabilizer, antioxidant, lubricant, silicone-type master batch, and carbon black master batch
PBT: n = 80~90, TRIBIT 1500 manufactured by Sam Yang Corp.
Diisocyanate: Lupranate MM103C manufactured by BASF
Carbodiimide: Stabaxol 1 manufactured by Bayer
Thermal stabilizer: 412S manufactured by SHIPRO Kasei Corp.
Antioxidant: Songnox 1076 manufactured by SongWon Industrial Corp.
Lubricant: EP861 manufactured by HENKEL Corp.
Silicone-type master batch: MB-50-010 manufactured by DOW CORNING Corp.
Carbon black master batch: BKA2 manufactured by Hyun Jin Chemical Co.

TABLE 2

| | | | elastic | impact strength[3] | | | | melt | mechanical physical property (kg/cm²) | | melt |
|---|---|---|---|---|---|---|---|---|---|---|---|
| | hardness | melt | recovery | | | | | | | | |
| | shore | index[1] | rate[2] | (kg cm/cm) | | HDT | Tm | tension | tensile | bending | viscosity[4] |
| | hardness-D | (g/10 min) | MIR | (%) | RT[5] | −40° C. | (° C.) | (° C.) | (mN) | strength[6] | strength | (Poise) |
| Ex. 1 | 42 | 1.20 | 1.05 | 38 | — | — | 80 | 190 | 65 | 250 | 155 | 48000 |
| Ex. 2 | 50 | 2.50 | 1.10 | 33 | — | — | 88 | 211 | 42 | 290 | 165 | 42000 |
| Ex. 3 | 42 | 1.20 | 1.10 | 34 | — | — | 75 | 201 | 63 | 242 | 150 | 47000 |
| Ex. 4 | 42 | 1.20 | 1.15 | 40 | — | — | 85 | 184 | 65 | 250 | 155 | 47500 |
| Comp. Ex. 1 | 40 | 0.90 | 0.85 | 25 | — | — | 65 | 204 | 64 | 230 | 140 | 52000 |
| Comp. Ex. 2 | 55 | 2.80 | 1.30 | 22 | — | 10 | 82 | 221 | 38 | 310 | 180 | 38000 |
| Comp. Ex. 3 | 42 | 14.0 | 1.50 | 15 | — | — | 65 | 204 | 10 | 160 | 55 | 3000 |
| Comp. Ex. 4 | 42 | 12.0 | 1.40 | 17 | — | — | 67 | 204 | 13 | 170 | 60 | 3500 |
| Comp. Ex. 5 | 42 | 0.50 | 0.60 | 20 | — | — | 74 | 185 | 63 | 230 | 130 | 54000 |
| Comp. Ex. 6 | 40 | 0.85 | 0.80 | 23 | — | — | 64 | 205 | 63 | 235 | 135 | 51000 |

[1] Testing temperature: 230° C.; Load: 2.16 kg
[2] Recovery rate after annealing for 20 hours at 120° C.
[3] —: No break
[4] Melt viscosity under the shear rate of 1 s$^{-1}$
[5] RT: Room temperature
[6] Strength on tension of the specimen processed according to ASTM D638 Type 1

As confirmed from Tables 1 and 2, Comparative Example 1 without PBT has a processability problem that MIR is 1.0 or less when compared with the Examples. Also, in Comparative Example 1, the processing temperature is high and the elastic recovery rate under the high temperature is low. In Comparative Example 2, the impact strength under low temperature is low and the processing temperature is higher than Example 2. Example 1 and 2 show that the increase of PBT content may increase hardness on the reactive extrusion. Comparative Example 3 and 4 show the same extrusion property and mechanical strength as those of TPE-A. Comparative Example 5 shows the same processability problem as Comparative Example 1. Comparative Example 6 shows a low elastic recovery rate and a high processing temperature, and a processability problem that MIR is less than 1.0.

INDUSTRIAL AVAILABILITY

The polyester-type thermoplastic elastomer resin prepared by reactive extrusion by using hydroxylcarboxylic acid compound, diisocyanate, carbodiimide, and additional additives, after melt polymerization using DEG-BPA according to the present invention, shows improved melt viscosity and melt index that results in good extrusion property, thermal resistance, chemical resistance, and durability, suitable for various automobile parts, particularly constant velocity joint boots and various bellows.

The invention claimed is:

1. Thermoplastic elastomer resin (TPE-A) which comprises 30~45 weight % of aromatic dicarboxylic acid, 15~30 weight % of diol having a low molecular weight, 20~50 weight % of polyalkylene oxide, and 0.3~9.0 weight % of bisphenol-alt-ethylene glycol oligomer, represented by the following formula (1):

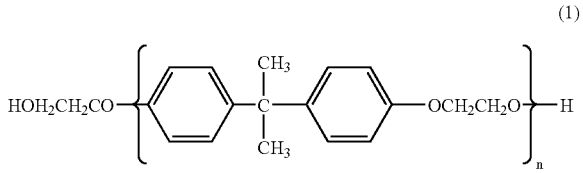

wherein n denotes a positive integer of 1 to 5.

2. The thermoplastic elastomer resin (TPE-A) of claim 1 wherein the inherent viscosity(I.V.) of TPE-A is 1.6~1.8 dl/g.

3. The thermoplastic elastomer resin (TPE-A) of claim 1, further comprising 0.05~0.10 weight % of glycerol.

4. The thermoplastic elastomer resin (TPE-A) of claim 1 wherein the aromatic dicarboxylic acid is selected from a group consisting of terephthalic acid, isophthalic acid, 1,5-dinaphthalenedicarboxylic acid, 2,6-dinaphthalenedicarboxylic acid, dimethyl terephthalate, dimethyl isophthalate, and mixtures thereof.

5. The thermoplastic elastomer resin (TPE-A) of claim 1 wherein the diol having a low molecular weight is selected from a group consisting of ethylene glycol, propylene glycol, 1,2-propane diol, 1,3-propane diol, 1,4-butane diol, 1,5-pentane diol, 1,6-hexane diol, 1,4-cyclohexane dimethanol, and mixtures thereof.

6. The thermoplastic elastomer resin (TPE-A) of claim 1 wherein the polyalkylene oxide is selected from a group consisting of polyoxyethylene glycol, polyoxyprophylene glycol, polyoxytetramethylene glycol, and mixtures thereof.

7. Thermoplastic elastomer resin (TPE-B) according to any one of claims 1 to 6 wherein it comprises 66~96.85 weight % of TPE-A, 3~28 weight % of hydroxy carboxylic acid compound, 0.1~5.0 weight % of diisocyanate, and 0.05~1.0 weight % of carbodiimide.

8. The thermoplastic elastomer resin (TPE-B) of claim 7 wherein the hydroxy carboxylic acid compound is selected from a group consisting of polyethylene terephthalate(PET), polyethylene naphthalate(PEN), polybuthylene naphthalate (PBN), polycyclohexane terephthalate(PCT), polybuthylene terephthalate(PBT), and mixtures thereof.

9. The thermoplastic elastomer resin (TPE-B) of claim 8 wherein the hydroxy carboxylic acid is polybuthylene terephthalate (PBT) represented by the following formula (2):

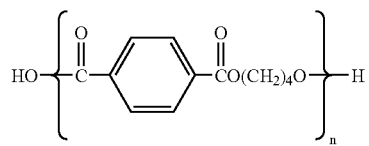

wherein n denotes a positive integer of 70 to 100.

10. The thermoplastic elastomer resin (TPE-B) of claim 7 wherein the diisocyanate is the modified product of 4,4-diphenylmethane diisocyanate represented by the following formula (3):

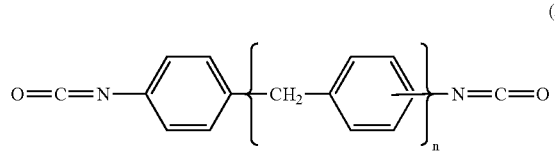

wherein n denotes a positive integer of 1 to 3 and the content of N=C=O is 29~30 weight %.

11. The thermoplastic elastomer resin (TPE-B) wherein the melt index ratio (MIR) is 1.0~1.5.

12. The thermoplastic elastomer resin (TPE-B) wherein the inherent viscosity of PBT is 0.7~1.3 dl/g.

13. A process for preparing thermoplastic elastomer resin (TPE-B) which comprises: (a) melt polymerization of 30~45 weight % of aromatic dicarboxylic acid, 15~30 weight % of diol having a low molecular weight, 20~50 weight % of polyalkylene oxide, 0.3~9.0 weight % of diethyleneglycol bisphenol-A defined in claim 1, and 0.05~0.10 weight % of glycerol, to prepare TPE-A; and (b) reactive extrusion of 66~96.85 weight % of TPE-A prepared in the above (a), 0.1~5.0 weight % of diisocyanate, and 0.05~1.0 weight % of carbodiimide, to prepare TPE-B.

14. The process of claim 13 wherein the diisocyanate is the modified product of 4,4-diphenylmethane diisocyanate defined in claim 10.

15. The process of claim 13 wherein the retention time in extruder in step (b) is between 50 and 80 seconds.

* * * * *